Sept. 1, 1942.   W. R. PLACE   2,294,420
TRIMMING DIE
Filed May 23, 1941   2 Sheets-Sheet 1
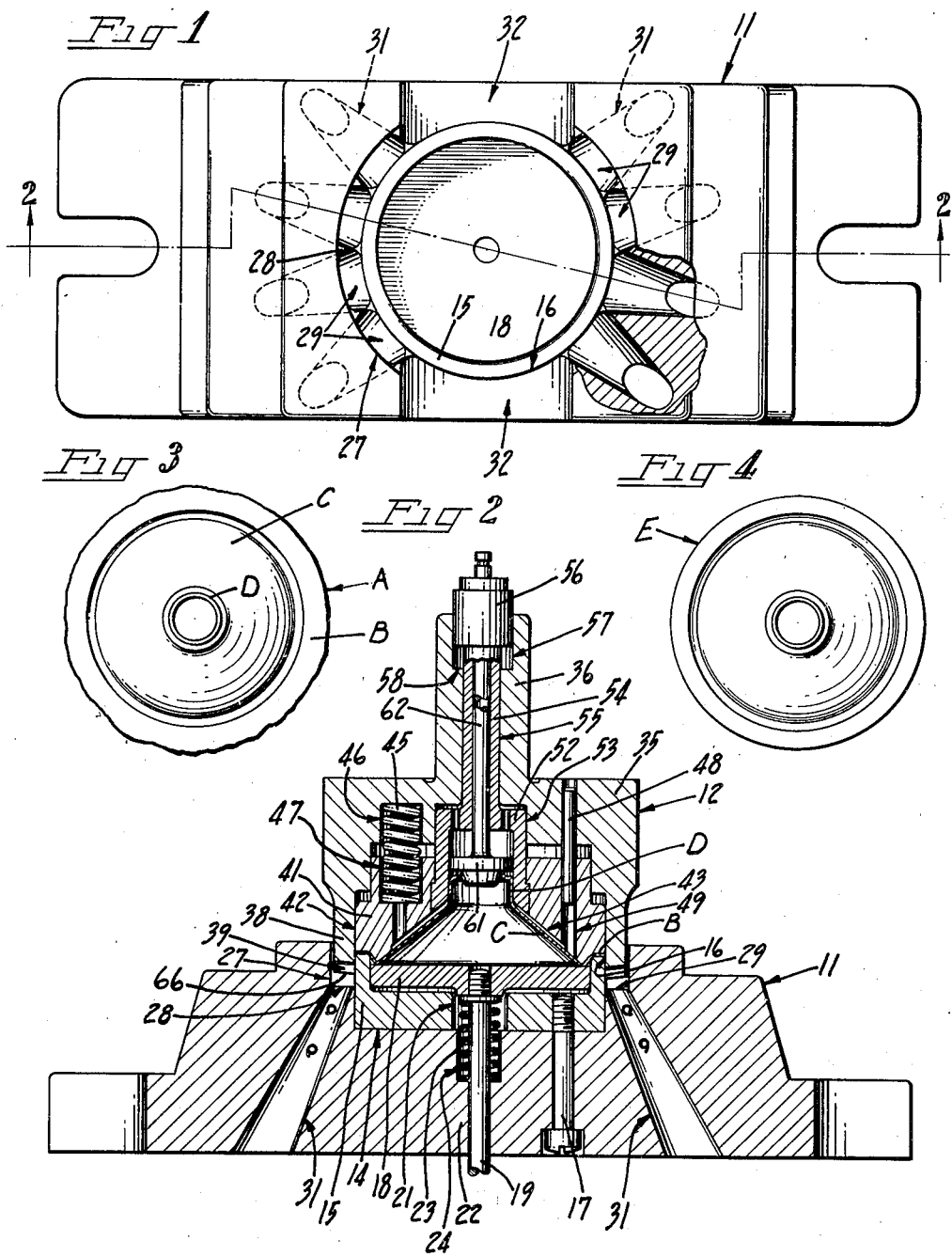
INVENTOR.
Walter R. Place
BY Ivan D. Thornburgh
Chas. H. Erne
ATTORNEYS

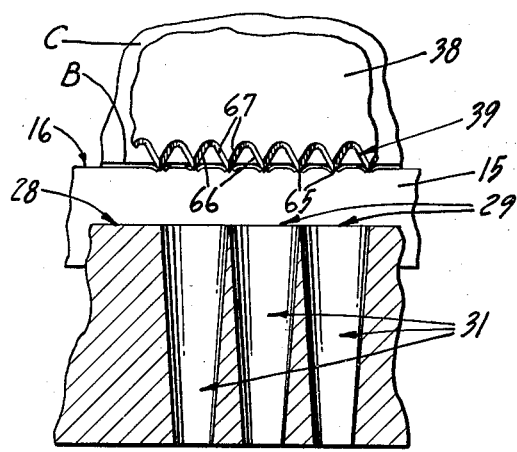
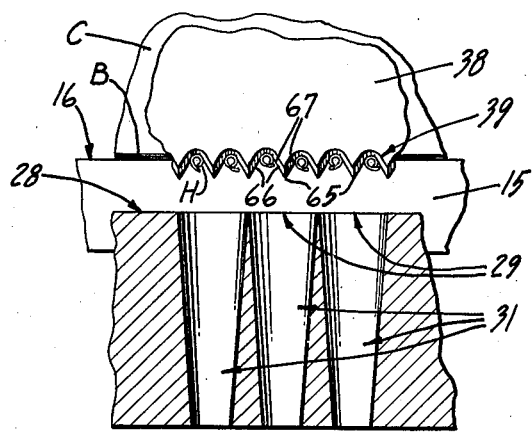
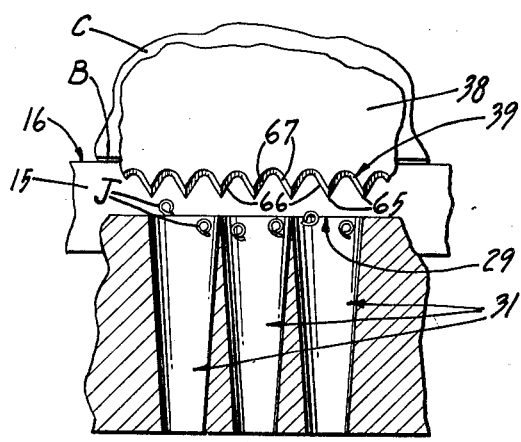

Patented Sept. 1, 1942

2,294,420

UNITED STATES PATENT OFFICE 2,294,420

TRIMMING DIE

Walter R. Place, Union, N. J., assignor to American Can Company, New York, N. Y., a corporation of New Jersey Application May 23, 1941, Serial No. 394,927

4 Claims. (Cl. 164—29)

The present invention relates to trimming dies for sheet metal articles and has particular reference to trimming or cutting away excess material in a manner which avoids leaving any skeleton scrap piece in the die.

In the manufacture of sheet metal containers or cans and other sheet metal articles, the flat blank from which the article is produced is sometimes drawn in suitable dies to form the article into a desired shape. Such drawing operations usually stretch the material unequally and this leaves the article with an uneven or irregular rough periphery which must subsequently be trimmed off. In trimming off this excess material with the usual trimming punch and die equipment, the trim is left as a skeleton in the die and this requires the use of suitable ejectors to remove the skeleton from the die.

The instant invention contemplates overcoming this difficulty by providing a trimming die in which the trim scrap is cut away as small pieces which fall from the die so that there will be no skelton formed to be ejected from the die.

An object therefore of the invention is the provision of a trimming die for cutting away scrap material from sheet metal articles wherein the material to be trimmed off is cut away in small pieces which will readily fall from the die so that the forming of a skeleton of scrap will be prevented.

Another object is the provision of such a trimming die wherein the cut away small pieces of scrap material are curled into the form of pellets which more readily fall away from the die and thereby prevent clogging or jamming of the die parts.

Numerous other objects and advantages of the invention will be apparent as it is better understood from the following description, which, taken in connection with the accompanying drawings, discloses a preferred embodiment thereof.

Referring to the drawings:

Figure 1 is a top plan view of the die block of a trimming die embodying the instant invention, with a part broken away and shown in section;

Fig. 2 is a longitudinal vertical section through the die block and its cooperating punch with an article being trimmed shown in place in the die, the view being taken substantially along the broken line 2—2 in Fig. 1;

Fig. 3 is a top plan view of an article to be trimmed and showing the irregular rough periphery to be trimmed off;

Fig. 4 is a top plan view of the same article after the trimming operation is performed as in the die shown in Figs. 1 and 2; and Figs. 5, 6 and 7 are enlarged sectional details of the punch and die block parts with an article in place and showing how the removal of the trim scrap material is effected.

As a preferred embodiment of the instant invention the drawings illustrate a trimming die for cutting away an irregular rough outer edge portion A (Fig. 3) of a round sheet metal can end B having a drawn conical shaped breast C which terminates in a nozzle or neck section D (see also Fig. 2). Trimming off of the rough edge portion A of the can end results in a desired smooth finished circumferential edge E (Fig. 4).

The trimming die includes a lower stationary element or die block 11 (Fig. 2) and an upper movable element or punch 12. The die block 11 is formed with a cylindrical recess 14 which contains a stationary die ring 15 (see also Fig. 1) having a straight outer cut edge 16 which extends around the top of the ring. The ring is held in place by screws 17 which extend up through the die block.

The top of the ring 15 is relieved and contains a flat stripper plate 18 which is normally flush with the top of the ring. This stripper plate is mounted on a stem 19 which extends down through a clearance opening 21 in the ring and through a bearing 22 in the die block. The plate is yieldably supported on a compression spring 23 which surrounds the stem and which is located in a flat bottom bore 24 in the die block.

The die ring 15 is surrounded by an annular recess 27 which is formed in the die block 11 and which has a flat bottom 28. Communicating with this annular recess 27 are a plurality of oblong openings 29 (see also Fig. 1) which constitute the upper open ends of tapered, angularly disposed discharge passageways 31 formed in the die block. These passageways extend down through the die block and open through its bottom surface. There are eight of these passageways shown in the drawings, four in a row located on opposite sides of the die ring and their openings 29 are contiguous with each other and with the die ring. Between the end openings 29 in each row the die block is cut away to form downwardly and outwardly sloping chutes 32.

The punch 12 includes a cylindrical body 35 having an integral stem 36 which is adapted to be clamped in the reciprocating cross head of a punch press or the like mechanism for moving the punch up and down relative to the die block 11. The lower end of the punch body 35 is formed with an annular punch ring 38 having a serrated cut edge 39 (see also Fig. 5) which cooperates with the straight cut edge 16 of the die ring 15 when the punch 12 is moved down into the die block 11.

The punch body 35 carries a pressure ring 41 (Fig. 2) which is located inside the punch ring 38 in a recess 42 formed in the punch body. The inner face of the pressure ring is formed with a conical clearance opening 43. Compression springs 45 provide a yieldable backing for the pressure ring. There are a plurality of these springs distributed adjacent the circumference of the ring and they are located in flat bottom bores 46, 47 formed respectively in the punch body and in the ring. Between the springs 45, a plurality of pilot pins 48 are secured in the punch body and these pins operate in guide holes 49 in the punch ring. These pilot pins prevent turning or relative rotation of the punch ring relative to the punch body.

The outward travel of the punch ring 41 in opposition to the resistance of the compression springs 45 is restricted by a shouldered sleeve 52 on which the ring is mounted. The sleeve extends up into a guide recess 53 formed in the punch body and is formed with a tubular shank 54 which extends up through a guide hole or bore 55 in the punch body stem 36. The upper end of the shank is provided with a stop collar 56 which is disposed in a recess 57 formed in the body stem. This recess sets off a bottom shoulder 58 in the stem and the collar engages against this shoulder to hold the pressure ring 41 in its normal position. In this normal position the outer or lower face of the pressure ring extends down below the serrated cut edge 39 of the punch ring 38.

A knockout element is provided in the punch 12 and this includes a knockout pad 61 which is located within the sleeve 52. The pad is formed on the lower end of a knockout rod 62 which extends up through the tubular shank 54 in the body stem 36 and projects beyond the shank collar 56. The upper exposed end of this knockout rod is engageable by the usual actuating element in the cross head of a punch press to depress the rod and to actuate the knockout pad 61.

In operation, a can end B to be trimmed is placed in the die block 11 so that it rests on the stripper plate 18, the conical breast C of the can end projecting upwardly. The rough edge A of the can end extends beyond and overhangs the cut edge 16 of the adjacent die ring 15.

While the can end is in this position the punch 12 moves down into the die block 11 to perform the trimming operation. As the punch moves down the pressure ring 41 envelops the upwardly projecting breast C and neck D of the can end, these can end parts entering up into the clearance recess 43 of the pressure ring and the interior of the sleeve 52. This shifts the can end on the stripper plate 18 and brings it into a central position in the die if it is not already in such a position. As the punch continues to move down the outer marginal edge of the pressure ring engages the can end and forces it and the stripper plate 18 down until the can end comes into engagement with the flat top of the die ring 15.

This engagement of the can end with the die ring 15 arrests further downward movement of the pressure ring. However, the punch body 35 continues to move down and thus compresses the springs 45. The springs in turn press against the pressure ring and thereby clamp it down tight against the can end. The can end is thus held against displacement while the punch continues to move down.

Continued downward movement of the punch 12 brings its serrated cut edge 39 down into engagement with the circumferential scrap portion of the can end that overhangs the cut edge 16 of the die ring 15. Sharp points 65 on the teeth of the serrated cut edge cooperate with the straight cut edge 16 of the die ring to pierce the can end as best shown in Fig. 5. These teeth are also formed with radial cut edges 66 which cut outwardly along radial lines of severance which in effect produce a plurality of radial slits in the scrap portion of the can end.

As the punch continues to descend, the teeth in the serrated cut edge move further into the stock of the can end and cut along a circumferential line of severance which extends in two opposite directions from each point of piercing of the stock. As the punch continues to move down this cutting action continues and at the same time the cut away stock is turned or bent downwardly and inwardly as best shown in Fig. 6. This bending is effected by flat bending surfaces 67 on the cut edge teeth. As this turning down action continues the cut-away stock curls up into the form of a chip indicated by the letter H in Fig. 6.

When the punch 12 has moved down far enough so that the innermost portion, i. e., the bottom of the V-teeth of the serrated cut edge passes the straight cut edge 16 of the die ring the curled-up chips H are severed entirely from the can end and fall away as pellets J, as shown in Fig. 7. It is this manner of cutting away or trimming off of the rough edge A that produces the clean smooth outer periphery E on the can end, as shown in Fig. 4.

The cut-away scrap pellets J fall into the discharge openings 29 of the holes 31 and into the chutes 32 adjacent the holes and are thus directed to any suitable place of deposit. Thus with such a construction of trimming die the removed scrap or trim is cut up into small pieces which readily fall away from the die and therefore leave no scrap skeleton. Need of an ejector to remove scrap from the die therefore does not exist. Such a manner of removing the scrap trim has numerous advantages such as compactness of scrap pieces due to their small size, no baling of scrap skeletons, ease of handling scrap and many others besides being more efficient, more accurate, and more simple than the usual trimming die.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A trimming die for sheet material articles, comprising in combination, a pair of cooperating cutting instrumentalities movable toward each other and between which the article to be trimmed may be interposed for the trimming operation, one of said instrumentalities having a straight cut edge and the other having a serrated cut edge setting off a series of separate cutting teeth each having angularly disposed cutting edges and having their adjacent edges inclined inwardly in opposite directions towards one another, whereby to cooperate with the straight cut edge of the other of said instrumentalities to shear the scrap material from the article in opposite directions to produce a plurality of small individual pieces disposed respectively between said teeth, to prevent leaving a scrap skeleton.

2. A trimming die for sheet material articles, comprising in combination, a die ring having a straight cut edge, and a punch ring movable toward said die ring and having a serrated cut edge which cooperates with the cut edge of said die ring to cut away scrap material in small pieces from an article interposed between said rings, said serrated cut edge having scrap bending faces which curl the scrap pieces into pellets as they are cut away from the article so that they will fall readily away from the die ring to prevent leaving a scrap skeleton on the die ring.

3. A trimming die for sheet material articles, comprising in combination, a die ring having a straight cut edge, and a punch ring movable toward said die ring and having a serrated cut edge which cooperates with the cut edge of said die ring to cut away scrap material in small pieces from an article interposed between said rings, said serrated cut edge having pointed teeth with radial cut edges and sloping bending faces which pierce and cut away the scrap material along radial and circumferential lines of severance and which curl the scrap material into pellets while it is being cut away so that the pellets will fall readily away from the die ring.

4. A trimming die for sheet material articles, comprising in combination, a stationary die block, a die ring in said die block and having a straight cut edge, a punch movable toward said die block, a pressure ring disposed in said punch for holding an article to be trimmed on said die ring, and a punch ring also in said punch and having a serrated cut edge which cooperates with the cut edge of said die ring in cutting away scrap material in small pieces from an article held in place on said die ring so that the trimmed off scrap material will fall readily away from said die ring, said die block having discharge openings and inclined chutes formed therein to direct the small pieces of trim scrap away from the die ring so that they will be prevented from collecting on the block.

WALTER R. PLACE.